United States Patent
Lee et al.

(10) Patent No.: US 10,548,171 B2
(45) Date of Patent: Jan. 28, 2020

(54) METHOD FOR PERFORMING RANDOM ACCESS AT ADAPTIVE TRANSMISSION POINT IN WIRELESS COMMUNICATION SYSTEM THAT USES MMWAVE BAND

(71) Applicant: LG ELECTRONICS INC., Seoul (KR)

(72) Inventors: Kilbom Lee, Seoul (KR); Jiwon Kang, Seoul (KR); Kitae Kim, Seoul (KR); Kungmin Park, Seoul (KR); Heejin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/577,494

(22) PCT Filed: May 19, 2016

(86) PCT No.: PCT/KR2016/005317
§ 371 (c)(1),
(2) Date: Nov. 28, 2017

(87) PCT Pub. No.: WO2016/195292
PCT Pub. Date: Dec. 8, 2016

(65) Prior Publication Data
US 2018/0152970 A1    May 31, 2018

Related U.S. Application Data

(60) Provisional application No. 62/167,902, filed on May 29, 2015.

(51) Int. Cl.
*H04W 74/08* (2009.01)
*H04B 7/06* (2006.01)
*H04W 84/12* (2009.01)

(52) U.S. Cl.
CPC ...... *H04W 74/0858* (2013.01); *H04B 7/0619* (2013.01); *H04B 7/0617* (2013.01); *H04W 84/12* (2013.01)

(58) Field of Classification Search
CPC ..... H04W 72/04; H04W 74/00; H04W 74/08; H04W 74/0858; H04W 84/12;
(Continued)

(56) References Cited

U.S. PATENT DOCUMENTS 5,909,436 A * 6/1999 Engstrom ............. H04L 5/0053
370/206
8,014,361 B2 * 9/2011 Ozluturk ............. H04W 74/004
370/335

(Continued)

FOREIGN PATENT DOCUMENTS

EP          2950461 A1   12/2015
KR   1020080095731 A    10/2008
(Continued)

*Primary Examiner* — Tri H Phan
(74) *Attorney, Agent, or Firm* — Dentons US LLP

(57) ABSTRACT

Provided is a method for performing random access, the method comprising: obtaining information associated with a phase pattern vector set and information associated with a sequence set to be used during a random access process; selecting one phase pattern vector corresponding to the number of repetitive transmissions of an RACH signal, among a plurality of phase pattern vectors included in the phase pattern vector set; transmitting, to a base station, an RACH signal during a time section corresponding to the number of repetitive transmissions of an RACH signal, at a predetermined transmission point in the entire time section corresponding to the maximum number of repetitive transmissions; and receiving, from the base station, an RACH response signal indicating an estimated sequence, an estimated phase pattern vector, and an estimated transmission point.

14 Claims, 10 Drawing Sheets

(58) Field of Classification Search
CPC ........... H04W 56/0035; H04W 74/085; H04W 74/0866; H04B 7/06; H04B 7/0617; H04B 7/0619; H04B 7/0621; H04B 7/0658; H04B 7/066; H04B 7/0663; H04L 27/2613; H04L 27/2636; H04L 27/2692; H04J 13/0044
See application file for complete search history.

(56) References Cited

U.S. PATENT DOCUMENTS

| | | | |
|---|---|---|---|
| 8,644,129 B2* | 2/2014 | Dinan | H04W 72/042 |
| | | | 370/206 |
| 9,814,076 B2* | 11/2017 | Kim | H04W 74/0833 |
| 10,148,419 B2* | 12/2018 | Lee | H04W 56/0085 |
| 10,306,482 B2* | 5/2019 | Hwang | H04W 4/70 |
| 10,341,156 B2* | 7/2019 | Lee | |
| 2009/0305693 A1* | 12/2009 | Shimomura | H04W 74/004 |
| | | | 455/422.1 |
| 2014/0376495 A1 | 12/2014 | Noh et al. | |
| 2015/0359003 A1* | 12/2015 | Kim | H04W 74/0833 |
| | | | 370/336 |
| 2018/0132280 A1* | 5/2018 | Lee | H04L 27/2692 |
| 2018/0145861 A1* | 5/2018 | Lee | H04L 27/2643 |
| 2018/0152970 A1* | 5/2018 | Lee | H04W 74/00 |
| 2018/0167193 A1* | 6/2018 | Lee | H04W 56/0085 |
| 2019/0239087 A1* | 8/2019 | Hwang | H04B 7/0413 |

FOREIGN PATENT DOCUMENTS

| | | |
|---|---|---|
| KR | 1020090009965 A | 1/2009 |
| KR | 102012086331 A | 8/2012 |
| WO | 2007142492 A2 | 12/2007 |
| WO | 2014115960 A1 | 7/2014 |

\* cited by examiner (a)  (b)

FIG. 8

| Sequence index | Phase pattern vector index | Correlation value |
|---|---|---|
| 0 | 0 | $\|\alpha_{0,0}+\alpha_{1,0}+\alpha_{2,0}+\alpha_{3,0}\|^2 \rightarrow 0$ |
| 0 | 1 | $\|\alpha_{0,0}-\alpha_{1,0}+\alpha_{2,0}-\alpha_{3,0}\|^2 \rightarrow 0$ |
| 0 | 2 | $\|\alpha_{0,0}+\alpha_{1,0}-\alpha_{2,0}-\alpha_{3,0}\|^2 \rightarrow \|4\alpha_0^1\|^2$ |
| 0 | 3 | $\|\alpha_{0,0}-\alpha_{1,0}-\alpha_{2,0}+\alpha_{3,0}\|^2 \rightarrow \|4\alpha_0^2\|^2$ |
| 1 | 0 | $\|\alpha_{0,1}+\alpha_{1,1}+\alpha_{2,1}+\alpha_{3,1}\|^2 \rightarrow 0$ |
| 1 | 1 | $\|\alpha_{0,1}-\alpha_{1,1}+\alpha_{2,1}-\alpha_{3,1}\|^2 \rightarrow 0$ |
| 1 | 2 | $\|\alpha_{0,1}+\alpha_{1,1}-\alpha_{2,1}-\alpha_{3,1}\|^2 \rightarrow 0$ |
| 1 | 3 | $\|\alpha_{0,1}-\alpha_{1,1}-\alpha_{2,1}+\alpha_{3,1}\|^2 \rightarrow \|4\alpha_0^2\|^2$ |

METHOD FOR PERFORMING RANDOM ACCESS AT ADAPTIVE TRANSMISSION POINT IN WIRELESS COMMUNICATION SYSTEM THAT USES MMWAVE BAND

This application is a National Stage Application of International Application No. PCT/KR2016/005317, filed on May 19, 2016, which claims the benefit of U.S. Provisional Application No. 62/167,902, filed on May 29, 2015, all of which are hereby incorporated by reference in their entirety for all purposes as if fully set forth herein.

TECHNICAL FIELD

The present invention relates to a wireless communication system, and more particularly, to a method of performing a random access by a user equipment at an adaptive transmission timing in a wireless LAN system using an mmWave band.

BACKGROUND ART

An ultrahigh frequency wireless communication system based on mmWave is configured to operate at a center frequency of several GHz to several tens of GHz. Due to such a characteristic of the center frequency, in a mmWave communication system, a pathloss may appear noticeably in a radio shadow area. Considering such a pathloss, it is necessary to improve a random access procedure between a user equipment (UE) and a base station (BS). Moreover, in case that a plurality of user equipments exist, it is necessary to design a random access procedure by considering possibility of potential collision between RACH (random access channel) signals.

DISCLOSURE OF THE INVENTION

Technical Task

The present invention is directed to solve the above problems of the general technology, and one technical task of the present invention is to establish a stable connection by improving a random access procedure between a base station and a user equipment in a wireless communication system.

Another technical task of the present invention is to resolve RACH signal collision between user equipments by adaptively adjusting a transmission timing for performing a random access.

Further technical task of the present invention is to configure a phase pattern vector set for a random access, thereby enabling a base station to perform a random access procedure without interference despite a dynamic transmission timing change.

The technical problems solved by the present invention are not limited to the above technical problems and other technical problems which are not described herein will become apparent to those skilled in the art from the following description.

Technical Solutions

In one technical aspect of the present invention, provided herein is a method of performing a random access, including obtaining information on a sequence set and a phase pattern vector set to use for an random access procedure, selecting a prescribed phase pattern vector corresponding to a repetitive transmission count of an RACH (random access channel) signal from a plurality of phase pattern vectors included in the phase pattern vector set, sending the RACH signal generated using a prescribed sequence selected from a plurality of sequences included in the sequence set and the selected phase pattern vector to a base station for a time interval amounting to the repetitive transmission count at a specific transmission timing in a whole time interval corresponding to a maximum repetitive transmission count, and receiving an RACH response signal indicating an estimated sequence, an estimated phase pattern vector and an estimated transmission timing from the base station.

A phase pattern vector set corresponding to a specific repetition count may be configured with usable phase pattern vectors only among all phase pattern vectors orthogonal to each other.

The usable phase pattern vectors may be determined to satisfy relation of being nested orthogonal to phase pattern vectors configuring a phase pattern vector set corresponding to a different repetition count.

If the maximum repetitive transmission count is 8, the specific transmission timing may correspond to a $0^{th}$ OFDM (orthogonal frequency division multiplexing) symbol. If the maximum repetitive transmission count is 4, the specific transmission timing may correspond to the $0^{th}$ OFDM symbol or a $4^{th}$ OFDM symbol. If the maximum repetitive transmission count is 2, the specific transmission timing may correspond to the $0^{th}$ OFDM symbol, a $2^{nd}$ OFDM symbol, the $4^{th}$ OFDM symbol, or a $6^{th}$ OFDM symbol.

The estimated sequence, the estimated phase pattern vector and the estimated transmission timing may be determined according to a sequence, phase pattern vector and repetition count that maximize a correlation value with the RACH signal sent by the user equipment.

If a service radius of the base station increases, the number of phase pattern vectors configuring a phase pattern vector set of a big repetition count may be defined to increase and the number of phase pattern vectors configuring a phase pattern vector set of a small repetition count may be defined to decrease.

In another technical aspect of the present invention, provided herein is a user equipment, including a transmitting unit, a receiving unit, and a processor configured to operate by being connected to the transmitting unit and the receiving unit, wherein the processor is further configured to obtain information on a sequence set and a phase pattern vector set to use for an random access procedure, select a prescribed phase pattern vector corresponding to a repetitive transmission count of an RACH (random access channel) signal from a plurality of phase pattern vectors included in the phase pattern vector set, control the transmitting unit to send the RACH signal generated using a prescribed sequence selected from a plurality of sequences included in the sequence set and the selected phase pattern vector to a base station for a time interval amounting to the repetitive transmission count at a specific transmission timing in a whole time interval corresponding to a maximum repetitive transmission count, and control the receiving unit to receive an RACH response signal indicating an estimated sequence, an estimated phase pattern vector and an estimated transmission timing from the base station.

Advantageous Effects

According to embodiments of the present invention, the following effects are expected.

First of all, as a random access procedure between a base station and a user equipment in a wireless communication system is improved, RACH signal collision of user equipments can be resolved.

Secondly, as a random access procedure can be improved by a process for differentiating a configuration of a phase pattern vector only, implementation complexity demanded for a base station is minimized.

Thirdly, an RACH procedure between user equipments respectively having different repetitive transmission counts can be performed without collision with interference.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

FIG. 8 is a diagram to describe a method of performing a random access procedure according to one embodiment.

BEST MODE FOR INVENTION

Figure 1:
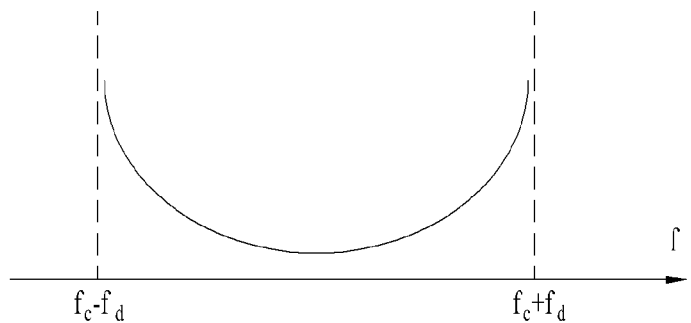
FIG. 1 is a diagram illustrating a Doppler spectrum.

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

In this document, the embodiments of the present invention have been described centering on a data transmission and reception relationship between a mobile station and a base station. The base station may mean a terminal node of a network which directly performs communication with a mobile station. In this document, a specific operation described as performed by the base station may be performed by an upper node of the base station.

Namely, it is apparent that, in a network comprised of a plurality of network nodes including a base station, various operations performed for communication with a mobile station may be performed by the base station, or network nodes other than the base station. The term base station may be replaced with the terms fixed station, Node B, eNode B (eNB), advanced base station (ABS), access point, etc.

The term mobile station (MS) may be replaced with user equipment (UE), subscriber station (SS), mobile subscriber station (MSS), mobile terminal, advanced mobile station (AMS), terminal, etc.

A transmitter refers to a fixed and/or mobile node for transmitting a data or voice service and a receiver refers to a fixed and/or mobile node for receiving a data or voice service. Accordingly, in uplink, a mobile station becomes a transmitter and a base station becomes a receiver. Similarly, in downlink transmission, a mobile station becomes a receiver and a base station becomes a transmitter.

Communication of a device with a "cell" may mean that the device transmit and receive a signal to and from a base station of the cell. That is, although a device substantially transmits and receives a signal to a specific base station, for convenience of description, an expression "transmission and reception of a signal to and from a cell formed by the specific base station" may be used. Similarly, the term "macro cell" and/or "small cell" may mean not only specific coverage but also a "macro base station supporting the macro cell" and/or a "small cell base station supporting the small cell".

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

1. Communication System Using Ultrahigh Frequency Band

In an LTE (Long Term Evolution)/LTE-A (LTE Advanced) system, an error value of oscillators between a UE and an eNB is defined by requirements as follows.

UE Side Frequency Error (in TS 36.101)

The UE modulated carrier frequency shall be accurate to within ±0.1 PPM observed over a period of one time slot (0.5 ms) compared to the carrier frequency received from the E-UTRA Node B eNB Side Frequency Error (in TS 36.104)

Frequency error is the measure of the difference between the actual BS transmit frequency and the assigned frequency.

Meanwhile, oscillator accuracy according to types of BS is as listed in Table 1 below.

TABLE 1

| BS class | Accuracy |
| --- | --- |
| Wide Area BS | ±0.05 ppm |
| Local Area BS | ±0.1 ppm |
| Home BS | ±0.25 ppm |

Therefore, a maximum difference in oscillators between a BS and a UE is ±0.1 ppm, and when an error occurs in one direction, an offset value of maximum 0.2 ppm may occur. This offset value is converted to a unit of Hz suitable for each center frequency by being multiplied by the center frequency.

Meanwhile, in an OFDM system, a CFO value is varied depending on a subcarrier spacing. Generally, the OFDM system of which subcarrier spacing is sufficiently great is relatively less affected by even a great CFO value. Therefore, an actual CFO value (absolute value) needs to be expressed as a relative value that affects the OFDM system. This will be referred to as normalized CFO. The normalized CFO is expressed as a value obtained by dividing the CFO value by the subcarrier spacing. The following Table 2 illustrates CFO of an error value of each center frequency and oscillator and normalized CFO.

TABLE 2

| Center frequency | Oscillator Offset | | | |
| --- | --- | --- | --- | --- |
| (subcarrier spacing) | ±0.05 ppm | ±0.1 ppm | ±10 ppm | ±20 ppm |
| 2 GHz (15 kHz) | ±100 Hz (±0.0067) | ±200 Hz (±0.0133) | ±20 kHz (±1.3) | ±40 kHz (±2.7) |
| 30 GHz (104.25 kHz) | ±1.5 kHz (±0.014) | ±3 kHz (±0.029) | ±300 kHz (±2.9) | ±600 kHz (±5.8) |
| 60 GHz (104.25 kHz) | ±3 kHz (±0.029) | ±6 kHz (±0.058) | ±600 kHz (±5.8) | ±1.2 MHz (±11.5) |

In Table 2, it is assumed that a subcarrier spacing is 15 kHz when the center frequency is 2 GHz (for example, LTE Rel-8/9/10). When the center frequency is 30 GHz or 60 GHz, a subcarrier spacing of 104.25 kHz is used, whereby throughput degradation is avoided considering Doppler effect for each center frequency. The above Table 2 is a simple example, and it will be apparent that another subcarrier spacing may be used for the center frequency.

Meanwhile, Doppler spread occurs significantly in a state that a UE moves at high speed or moves at a high frequency band. Doppler spread causes spread in a frequency domain, whereby distortion of a received signal is generated in view of the receiver. Doppler spread may be expressed as $f_{doppler}=(v/\lambda)\cos\theta$. At this time, v is a moving speed of the UE, and $\lambda$ means a wavelength of a center frequency of a radio wave which is transmitted. $\theta$ means an angle between the radio wave and a moving direction of the UE. Hereinafter, description will be given on the assumption that $\theta$ is 0.

At this time, a coherence time is inverse proportion to Doppler spread. If the coherence time is defined as a time spacing of which correlation value of a channel response in a time domain is 50% or more, the coherence time is expressed as $$T_c \approx \frac{9}{16\pi f_{doppler}}.$$

In the wireless communication system, the following Equation 1 which indicates a geometric mean between an equation for Doppler spread and an equation for the coherence time is used mainly.

$$T_c = \sqrt{\frac{9}{16\pi f_{doppler}}} = \frac{0.423}{f_{doppler}} \quad \text{[Equation 1]}$$

FIG. 1 is a diagram illustrating a Doppler spectrum.

A Doppler spectrum or Doppler power spectrum density, which indicates a change of a Doppler value according to a frequency change, may have various shapes depending on a communication environment. Generally, in an environment, such as downtown area, where scattering occurs frequently, if received signals are received at the same power in all directions, the Doppler spectrum is indicated in the form of U-shape as shown in FIG. 1. FIG. 1 shows a U-shaped Doppler spectrum when the center frequency is $f_c$ and a maximum Doppler spread value is $f_d$.

Figure 2:
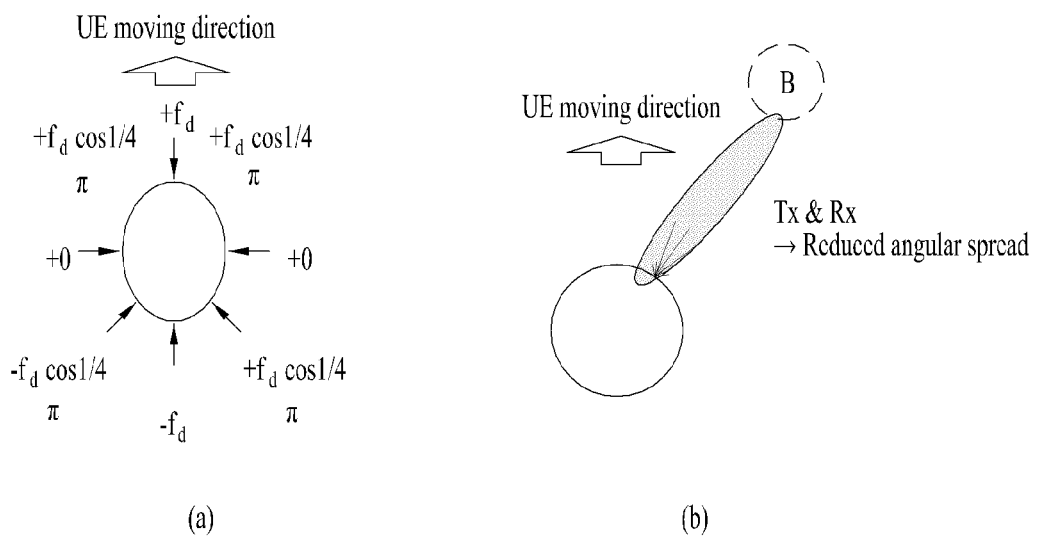
FIG. 2 is a diagram illustrating narrow beamforming related to the present invention.
Figure 3:
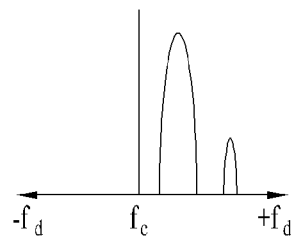
FIG. 3 is a diagram illustrating a Doppler spectrum when narrow beamforming is performed.

FIG. 2 is a diagram illustrating narrow beamforming related to the present invention, and FIG. 3 is a diagram illustrating a Doppler spectrum when narrow beamforming is performed.

In the ultrahigh frequency wireless communication system, since the center frequency is located at a very high band, a size of an antenna is small and an antenna array comprised of a plurality of antennas may be installed in a small space. This characteristic enables pin-point beamforming, pencil beamforming, narrow beamforming, or sharp beamforming, which is based on several tens of antennas to several hundreds of antennas. This narrow beamforming means that a received signal is received at a certain angle only not a constant direction.

FIG. 2(a) illustrates that a Doppler spectrum is represented in the form of U-shape depending on a signal received in a constant direction, and FIG. 2(b) illustrates that narrow beamforming based on a plurality of antennas is performed.

As described above, if narrow beamforming is performed, the Doppler spectrum is represented to be narrower than U-shape due to reduced angular spread. As shown in FIG. 3, it is noted from the Doppler spectrum when narrow beamforming is performed that Doppler spread is generated at a certain band only.

The aforementioned wireless communication system using the ultrahigh frequency band operates on a band having a center frequency ranging from several GHz to several tens of GHz. The characteristics of such a center frequency further worsen Doppler Effect generated from migration of a user equipment or influence of CFO due to an oscillator difference between a transmitter and a receiver.

Figure 4:
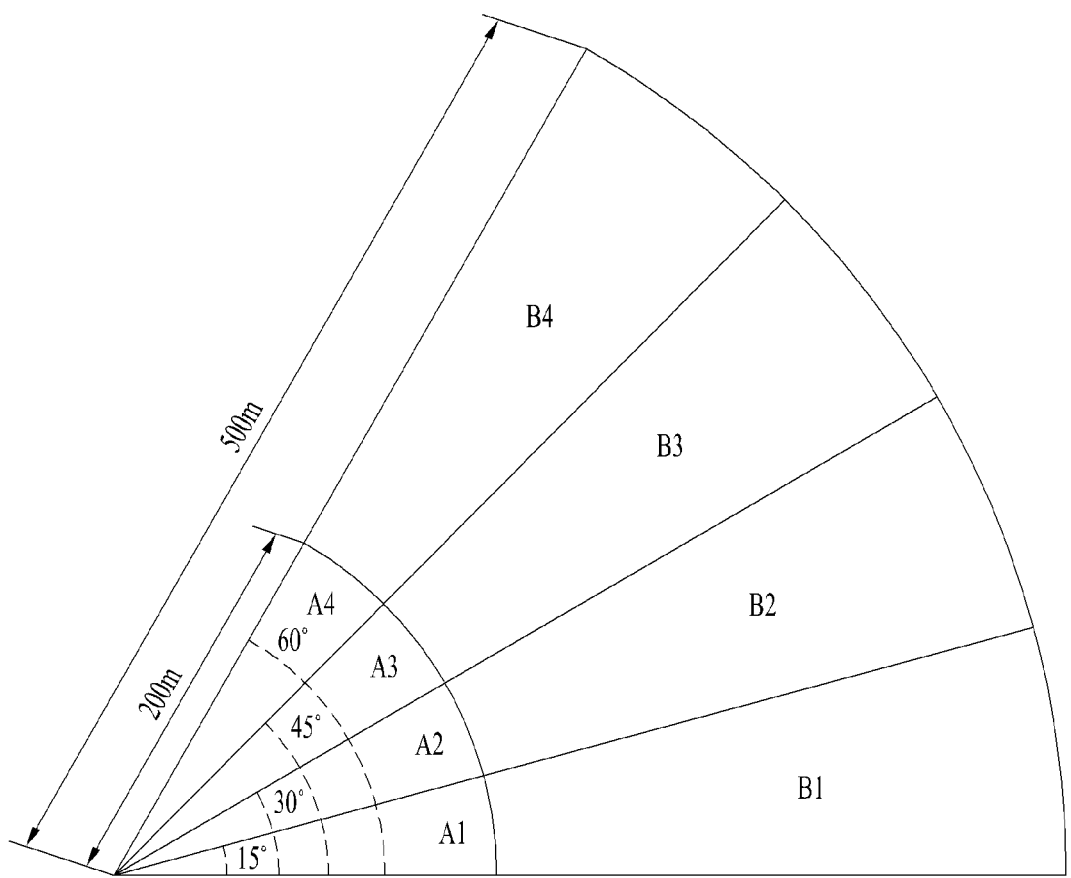
FIG. 4 is a diagram showing an example of a synchronization signal service area of a base station.

FIG. 4 is a diagram showing an example of a synchronization signal service area of a base station.

A user equipment (hereinafter abbreviated UE) performs synchronization with a base station using a downlink (DL) synchronization signal transmitted by the base station. In such a synchronization process, timing and frequency are synchronized between the base station and the UE. In order to enable UEs in a specific cell to receive and use a synchronization signal in a synchronization process, the base station transmits the synchronization signal by configuring a beam width as wide as possible.

Meanwhile, in case of an mmWave communication system that uses a high frequency band, a path loss in synchronization signal transmission appears greater than that of a case of using a low frequency band. Namely, a system using a high frequency band has a supportable cell radius reduced more than that of a related art cellular system (e.g., LTE/LTE-A) using a relatively low frequency band (e.g., 6 GHz or less).

As a method for solving the reduction of the cell radius, a synchronization signal transmitting method using a beamforming may be used. Although a cell radius increases in case of using a beamforming, a beam width is reduced disadvantageously. Equation 2 shows variation of a received signal SINR according to a beam width.

$$W \to M^{-2} W$$

$$SINR \to M^2 SINR \qquad [\text{Formula 2}]$$

If a beam width is reduced by $M^{-2}$ time according to a beamforming, Equation 2 indicates that a received SINR is improved by $M^2$ times.

Beside such a beamforming scheme, as another method for solving the cell radius reduction, it is able to consider a scheme of transmitting a same synchronization signal repeatedly. In case of such a scheme, although an addition resource allocation is necessary or a time axis, a cell radius can be advantageously increased without a decrease of a beam width.

Meanwhile, a base station allocates a resource to each UE by scheduling a frequency resource and a time resource located in a specific section. In the following, such a specific section shall be defined as a sector. In the sector shown in FIG. 4, A1, A2, A3 and A4 indicate sectors having widths of 0~15', 15~30', 30~45' and 45~60' in radius of 0~200 m, respectively. B1, B2, B3 and B4 indicate sectors having widths of 0~15', 15~30', 30~45' and 45~60' in radius of 200~500 m, respectively. Based on the substance shown in FIG. 4, sector 1 is defined as {A1, A2, A3, A4} and sector 2 is defined as {A1, A2, A3, A4, B1, B2, B3, B4}. Moreover, if a current synchronization signal service area of a base station is the sector 1, in order for the base station to service a synchronization signal for the sector 2, assume that an additional power over 6 dB is required for a transmission of a synchronization signal.

First of all, in order to service the sector 2, the base station can obtain an additional gain of 6 dB using a beamforming scheme. Through such a beamforming process, a service radius can be extended from A1 to B1. Yet, since a beam width is reduced through the beamforming, A2 to A3 cannot be serviced simultaneously. Hence, when a beamforming is performed, a synchronization signal should be sent to each of the A2~B2, A3~B3, and A4~B4 sectors separately. So to speak, in order to service the sector 2, the base station should transmit the synchronization signal by performing the beamforming four times.

On the other hand, considering the aforementioned repetitive transmission of the synchronization signal, the base station may be able to transmit the synchronization signal to the whole sector 2. Yet, the synchronization signal should transmit the synchronization signal on a time axis repeatedly four times. Consequently, a resource necessary to service the sector 2 is identical for both a beamforming scheme and a repetitive transmission scheme.

Yet, since a beam width is narrow in case of to beamforming scheme, a UE moving fast or a UE located on a sector boundary has difficulty in receiving a synchronization signal stably. Instead, if an ID of a UE located beam is identifiable, a UE can advantageously grasp its location through a synchronization signal. On the contrary, since a beam width is wide in case of a repetitive transmission scheme, it is less probable that a UE misses a synchronization signal. Instead, the UE is unable to grasp its location.

Figure 5:
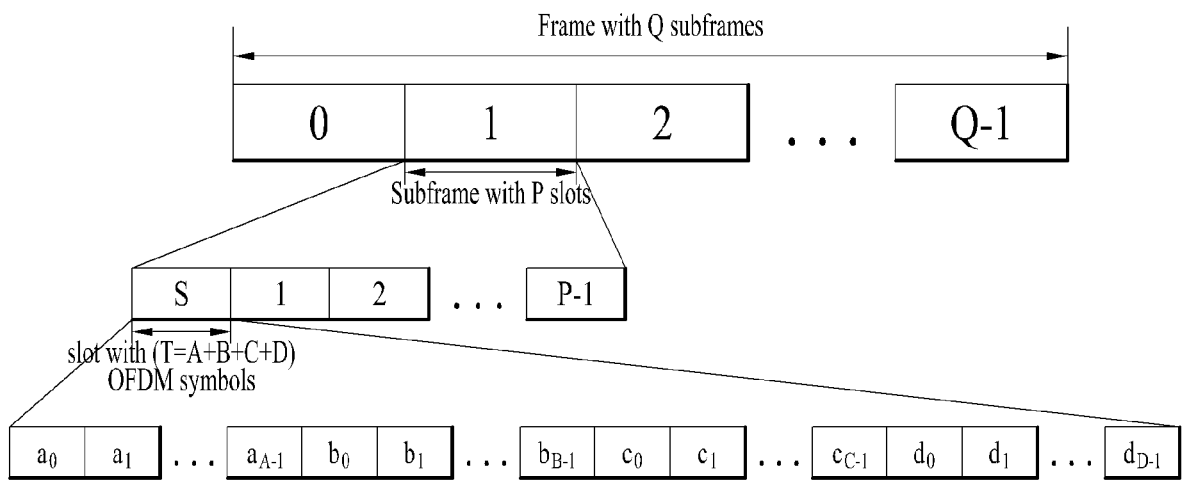
FIG. 5 shows an example of a frame structure proposed in a communication environment that uses mmWave.

FIG. 5 shows an example of a frame structure proposed in a communication environment that uses mmWave.

First of all, a single frame is configured with Q subframes, and a single subframe is configured with P slots. And, one slot is configured with T OFDM symbols. Here, unlike other subframes, a first subframe in a frame uses $0^{th}$ slot (slot denoted by 'S') for the usage of synchronization. And, the $0^{th}$ slot is configured with A OFDM symbols for timing and frequency synchronization, B OFDM symbols for beam scanning, and C OFDM symbols for informing a UE of system information. And, the remaining D OFDM symbols are used for data transmission to each UE.

Meanwhile, such a frame structure is a simple example only. Q, P, T, S, A, B, C and D are random values, and may include values set by a user or values set automatically on a system.

In the following, algorithm of timing synchronization between a base station and a UE is described. Let's consider a case that the base station transmits the same synchronization signal A times in FIG. 5. Based on the synchronization signal transmitted by the base station, the UE performs timing synchronization using the algorithm of Equation 3.

$$\hat{n} = \underset{\tilde{n}}{\mathrm{argmin}} \frac{\left|\sum_{i=0}^{A-2} y_{\tilde{n},i}^H y_{\tilde{n},i+1}\right|}{\sum_{i=0}^{A-2} |y_{\tilde{n},i}^H y_{\tilde{n},i+1}|}$$ [Equation 3]

where $y_{\tilde{n},i} \triangleq r[\tilde{n}+i(N+N_g):\tilde{n}+i(N+N_g)+N-1]$

In Equation 3, N, $N_g$ and i indicate a length of OFDM symbol, a length of CP (Cyclic Prefix) and an index of OFDM symbol, respectively. r means a vector of a received signal in a receiver. Here, the equation $y_{\tilde{n},i} \triangleq r[\tilde{n}+i(N+N_g):\tilde{n}+i(N+N_g)+N-1]$ is a vector defined with elements ranging from $(\tilde{n}+i(N+N_g))$th element to $(\tilde{n}+i(N+N_g)+N-1)$th of the received signal vector r.

The algorithm of Equation 3 operates on the condition that 2 OFDM received signals adjacent to each other temporally are equal to each other. Since such an algorithm can use a sliding window scheme, it can be implemented with low complexity and has a property robust to a frequency offset.

Meanwhile, Equation 4 represents an algorithm of performing timing synchronization using correlation between a received signal and a signal transmitted by a base station.

$$\hat{n} = \underset{\tilde{n}}{\mathrm{argmin}} \frac{\left|\sum_{i=0}^{A-1} y_{\tilde{n},i}^H s\right|^2}{\sum_{i=0}^{A-1} |y_{\tilde{n},i}|^2 \sum_{i=0}^{A-1} |s|^2}$$ [Equation 4]

In Equation 4, s means a signal transmitted by a base station and is a signal vector pre-agreed between a UE and a base station. Although the way of Equation 4 may have performance better than that of Equation 3, since Equation 4 cannot be implemented by a sliding window scheme, it requires high complexity. And, the way of Equation 4 has a property vulnerable to a frequency offset.

In continuation with the description of the timing synchronization scheme, a beam scanning process is described as follows. First of all, a beam scanning means an operation of a transmitter and/or a receiver that looks for a direction of a beam that maximizes a received SINR of the receiver. For example, a base station determines a direction of a beam through a beam scanning before transmitting data to a UE.

Further description is made by taking FIG. 4 as one example. FIG. 4 shows that a sector serviced by a single base station is divided into 8 areas. Here, the base station transmits a beam to each of (A1+B1), (A2+B2), (A3+B3) and (A4+B4) areas, and a UE can identify the beams transmitted by the base station. On this condition, a beam scanning process can be embodied into 4 kinds of processes. First of all, the base station transmits beams to 4 areas in sequence [i]. The UE determines a beam decided as a most appropriate beam among the beams in aspect of a received SINR [ii]. The UE feds back information on the selected beam to the base station [iii]. The base station transmits data using a beam having the direction of the feedback [iv]. Through the above beam scanning process, the UE can receive DL data through a beam having an optimized received SINR.

Zadoff-Chu sequence is described in the following. Zadoff-Chu sequence is called Chu sequence or ZC sequence and defined as Equation 5.

$$x_r[n] = e^{\frac{j\pi rn(n+1)}{N}}$$ [Equation 5]

In Equation 5, N indicates a length of sequence, r indicates a root value, and $x_r[n]$ indicates an $n^{th}$ element of ZC sequence. The ZC sequence is characterized in that all elements are equal to each other in size [constant amplitude]. Moreover, a DFT result of ZC sequence is also identical for all elements.

In the following, ZC sequence and a cyclic shifted version of the ZC sequence have the following correlation such as Equation 6.

$$(x_r^{(i)})^H x_r^{(j)} = \begin{cases} N & \text{for } i = j \\ 0 & \text{elsewhere} \end{cases}$$ [Equation 6]

In Equation 6, $X_r^{(i)}$ is a sequence resulting from cyclic-shifting $X_r$ by i, and indicates 0 except a case that auto-correlation of ZC sequence is i=j. The ZC sequence also has zero auto-correlation property and may be expressed as having CAZAC (Constant Amplitude Zero Auto Correlation) property.

Regarding the final property of the ZC sequence ZC, the correlation shown in Equation 7 is established between ZC sequences having a root value that is a coprime of a sequence length N.

$$x_{r_1}^H x_{r_2} = \begin{cases} N & \text{for } r_1 = r_2 \\ \frac{1}{\sqrt{N}} & \text{elsewhere} \end{cases}$$ [Equation 7]

In equation 7, $r_1$ or $r_2$ is a coprime of N. For example, if N=111, $2 \leq r_1, r_2 \leq 110$ always meets Equation 7. Unlike auto-correlation of Equation 6, the mutual correlation of ZC sequence does not become 0 completely.

In continuation with ZC sequence, Hadamard matrix is described. The Hadamard matrix is defined as Equation 8.

$$H_{2^k} = \begin{bmatrix} H_{2^{k-1}} & H_{2^{k-1}} \\ H_{2^{k-1}} & -H_{2^{k-1}} \end{bmatrix} = H_2 \otimes H_{2^{k-1}}$$ [Equation 8]

where $H_1 = [1]$ $$H_2 = \begin{bmatrix} 1 & 1 \\ 1 & -1 \end{bmatrix}$$

In Equation 8, $2^k$ indicates a size of matrix. Hadamard matrix is a unitary matrix that always meets $H_n H_n^T = nI_n$ irrespective of a size n. Moreover, in Hadamard matrix, all columns and all rows are orthogonal to each other. For example, if n=4, Hadamard matrix is defined as Equation 9.

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \qquad [\text{Equation 9}]$$

From Equation 9, it can be observed that columns and rows are orthogonal to each other.

Figure 6:
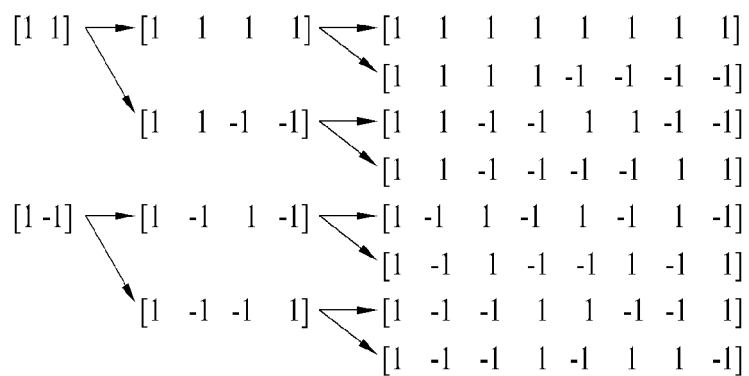
FIG. 6 shows a structure of OVSF (orthogonal variable spreading factor) code.

FIG. 6 shows a structure of OVSF (orthogonal variable spreading factor) code. The OVSF code is the code generated on the basis of Hadamard matrix and has specific rules.

First of all, in diverging to the right in the OVSF code [lower branch], a first code repeats a left mother code twice as it is and a second code is generated from repeating an upper code once, inverting it and then repeating the inverted code once. FIG. 6 shows a tree structure of OVSF code.

Such an OVSF code secures all orthogonality except the relation between adjacent mother and child codes on a code tree. For example, in FIG. 6, a code [1 −1 1 −1] is orthogonal to all of [1 1], [1 1 1 1], and [1 1 −1 −1]. Moreover, regarding the OVSF code, a length of code is equal to the number of available codes. Namely, it can be observed from FIG. 6 that a length of a specific ode is equal to the total number in a branch having the corresponding code belong thereto.

Figure 7:
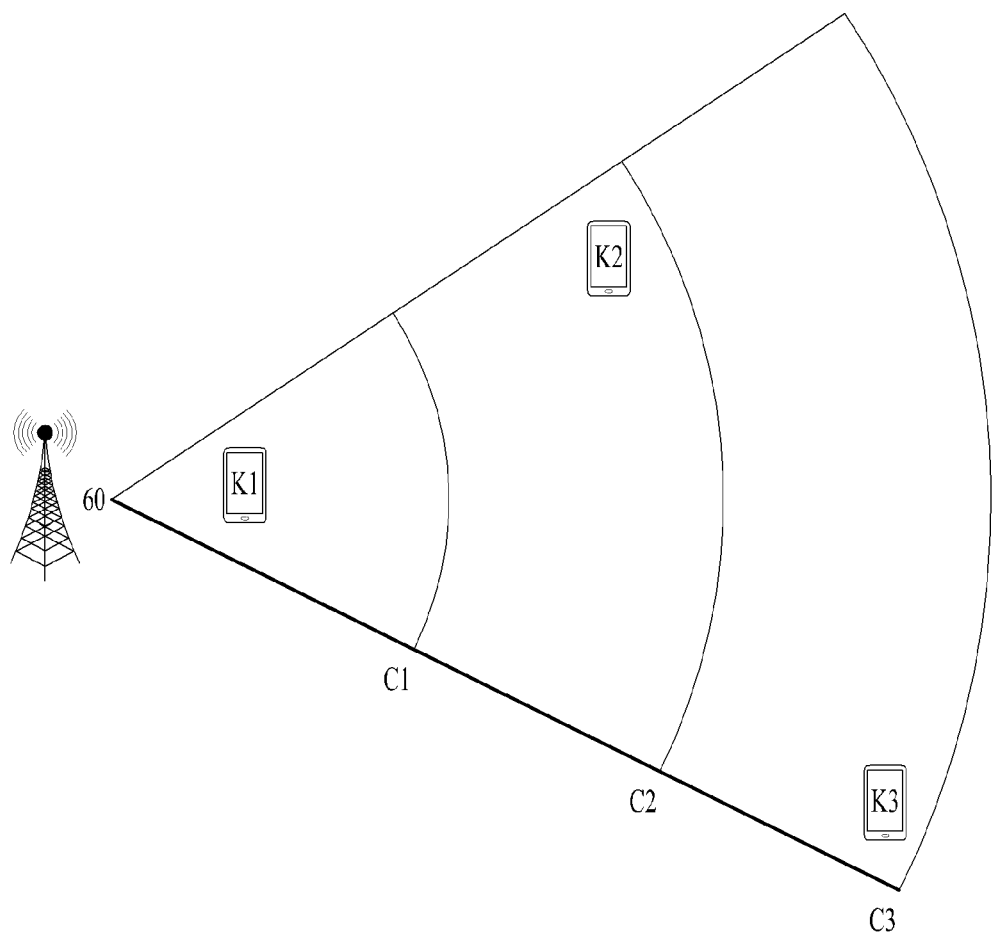
FIG. 7 is a diagram to describe a disposed situation of user equipments.

FIG. 7 is a diagram to describe a disposed situation of user equipments. RACH (Random Access CHannel) is described with reference to FIG. 7.

In case of LTE system, when RACH signals transmitted by UEs arrive at a base station, powers of the RACH signals of UEs received by the base station should be equal to each other. To this end, the base station defines a parameter 'preambleInitialReceivedTargetPower', thereby broadcasting the parameter to all UEs within a corresponding cell through SIB (System Information Block) 2. The UE calculates a pathloss using a reference signal, and then determines a transmit power of the RACH signal using the calculated pathloss and the parameter 'preambleInitialReceivedTargetPower' like Equation 10.

$P\_PRACH\_Initial=\min \{P\_CMAX,\text{preambleInitial-}$
$\text{ReceivedTargetPower}+PL\}$ [Equation 10]

In Equation 10, P_PRACH_Initial, P_CMAX, and PL indicate a transmit power of RACH signal, a maximum transmit power of UE, and a pathloss, respectively.

Equation 10 is taken as one example for the following description. A maximum transmittable power of UE is assumed as 23 dBm, and a RACH reception power of a base station is assumed as −104 dBm. And, a UE disposed situation is assumed as FIG. 7.

First of all, a UE calculates a pathloss using a received synchronization signal and a beam scanning signal and then determines a transmit power based on the calculation. Table 3 shows a pathloss of UE and a corresponding transmit power.

In case of a UE K1 in table 3, a pathloss is very small. Yet, in order to match an RACH reception power, an RACH signal should be transmitted with very small power (−44 dBm). Meanwhile, in case of a UE K2, although a pathloss is big, a necessary transmit power is 6 dBm. Yet, in case of a UE K3, since a pathloss is very big, a necessary transmit power exceeds P_CMA=23 dBm. In this case, the UE should perform a transmission with 23 dBm that is a maximum transmit power and a rate of UE's RACH access success is degraded by 3 dB.

2. First Proposed Random Access Performing Method

In the following description, a random access procedure (or, an RACH procedure) performed in a wireless communication system using an ultrahigh frequency band is proposed and proposed embodiments are described in detail through FIGS. 8 to 10.

According to a proposed embodiment, in order to lower probability of collision occurring in an RACH procedure, a repeatedly transmitted RACH signal is defined using a sequence and a phase pattern vector. In particular, if a user equipment (hereinafter abbreviated UE) repeatedly sends an RACH signal to a base station (hereinafter abbreviated BS) as many times as a predetermined repetition count, a scalar value applied to a sequence can be varied instead of repeatedly sending the same sequence simply. Since such a scalar value changes a phase of a sequence, it is defined as 'phase pattern vector'. And, a plurality of phase pattern vectors can be defined as a single phase pattern vector set.

For example, although two UEs send RACH signals by selecting a same sequence in an RACH procedure, if the two UEs select different phase pattern vectors, respectively, the RACH procedure can be performed between the two UEs without collision. This means that a BS can distinguish the RACH signals of the two UEs without mutual interference. A proposed embodiment is described in detail as follows.

First of all, a phase pattern vector set for an RACH procedure is shared between a UE and a BS. The phase pattern vector set may be shared by the UE and the BS in a manner of being determined by the BS and then transmitted to the UE. On the other hand, if a fixed phase pattern vector set is defined, the UE and the BS agree to use a single phase pattern vector set offline in advance.

Meanwhile, a phase pattern vector set is configured with a plurality of phase pattern vectors orthogonal or quasi-orthogonal to each other for the same repetition count. For example, a phase pattern vector set according to one embodiment can be implemented in Hadamard form, and each row or column of the Hadamard matrix described in Equation 8 or Equation 9 can configure a single phase pattern vector. In Table 4, an example of a phase pattern vector set implemented in Hadamard form is shown. In Table 4, when a vector size is 4, 4 vectors orthogonal to each other become 4 phase pattern vectors configuring a phase pattern vector set.

TABLE 3

| UE | preambleInitialReceivedTargetPower | Pathloss | Necessary transmit power | Transmit power | Additional necessary power |
|---|---|---|---|---|---|
| K1 | −104 dBm | 60 dB | −44 dBm | −44 dBm | 0 dBm |
| K2 | −104 dBm | 110 dB | 6 dBm | 6 dBm | 0 dBm |
| K3 | −104 dBm | 130 dB | 26 dBm | 23 dBm | 3 dBm |

TABLE 4

| Index | Phase pattern vector |
|---|---|
| 0 | [1 1 1 1] |
| 1 | [1 −1 1 −1] |
| 2 | [1 1 −1 −1] |
| 3 | [1 −1 −1 1] |

According to another embodiment, a phase pattern vector set can be implemented in DFT (Discrete Fourier Transform) form. Table 5 shows an example of a phase pattern vector set implemented in DFT form.

TABLE 5

| Index | Phase pattern vector |
|---|---|
| 0 | [1 1 1 1] |
| 1 | [1 −1 1 −1] |
| 2 | [1 −j −1 j] |
| 3 | [1 j −1 −j] |

Subsequently, using the aforementioned phase pattern vector set, a process for a UE to generate an RACH signal is described. A UE selects a prescribed phase pattern vector from a phase pattern vector set and applies the selected phase pattern vector to a process for transmitting RACH signal as many times as a prescribed repetition count. Particularly, the UE sends RACH signals corresponding to a repetition count by multiplying the same sequence by scalar values contained in the selected phase pattern vector.

For example, a repetition count is 4, $S_2$ is selected as a sequence of RACH signals, and a $3^{rd}$ phase pattern vector [1 −1 −1 1] is selected from the phase pattern vector set of Table 4. Such a case is described as follows. A UE can generate RACH signals to send for the repetition count '4' like Equation 11 by applying the selected phase pattern vector to the selected sequence.

$$S_2 \rightarrow -S_2 \rightarrow -S_2 \rightarrow S_2 \quad \text{[Equation 11]}$$

According to Equation 11, a UE sends total 4 RACH signals, which are generated by applying the phase pattern vector [1 −1 −1 1] to the sequence $S_2$, for 4 time intervals (e.g., OFDM symbols) to a BS. Each element of the phase pattern vector becomes a scalar value by which the sequence is multiplied according to the former description.

Subsequently, a process for a BS to process an RACH signal received from a UE is described. The BS calculates correlation between parameters of the received RACH signal and a combination of a random sequence and a phase pattern vector and selects a combination of a specific sequence and a phase pattern vector, which maximizes a value of the calculated correlation. The BS determines the selected sequence and phase pattern vector as a sequence and phase pattern vector used for an RACH procedure by the UE.

A process for a BS to calculate correlation can be expressed as Equation 12.

$$\{\hat{j}, \hat{k}\} = \underset{\bar{j}, \bar{k}}{\mathrm{argmax}} \left| \sum_{i=0}^{R-1} (x_{i,\bar{j}})^* y_i^H s_{\bar{k}} \right|^2 \quad \text{[Equation 12]}$$

In Equation 12, $\hat{j}$ and $\hat{k}$ indicate a specific phase pattern vector and sequence, which maximize a correlation value, respectively, $\bar{j}$ and $\bar{k}$ indicate a random phase pattern vector and sequence, which become calculation targets of the correlation value, respectively, R indicates a repetition count of a predetermined RACH signal, and $x_{i,j}$ indicates an $i^{th}$ element of a $j^{th}$ phase pattern vector. Moreover, in Equation 12, in a similar manner of the definition of Equation 3, $y_i$ is a vector defined with $[i(N+N_g)]^{th}$ to $[i(N+N_g)+N-1]^{th}$ elements of an Rx signal vector r of a BS, and $s_{\bar{k}}$ indicates a $\bar{k}$ th sequence in the whole sequence set.

Eventually, Equation 12 means a process for a BS to calculate correlation values among a received RACH signal, a random sequence $s_{\bar{k}}$ and a random phase pattern vector $\bar{j}([x_{0,\bar{j}}x_{1,\bar{j}}\ldots x_{R-1,\bar{j}}])$. The BS searches for a sequence and phase pattern vector combination $(\hat{k},\hat{j})$ that maximizes a correlation value $(\hat{k},\hat{j})$.

For example, Table 6 shows sequences and phase pattern vectors selected by 3 user equipments UE 1, UE 2, and UE 3. Here, a repetitive transmission count of RACH signal is 4 and a phase pattern vector set of Table 4 is used. Such a case is represented.

TABLE 6

| UE | Sequence | Phase pattern vector |
|---|---|---|
| UE 1 | $S_0$ | [1 1 −1 −1] (Index 2) |
| UE 2 | $S_0$ | [1 −1 −1 1] (Index 3) |
| UE 3 | $S_1$ | [1 −1 −1 1] (Index 3) |

In Table 6, let's consider a case that 3 UEs send RACH signals repeatedly 4 times through the same time and frequency resources. In this case, a BS calculates correlation values of RACH signals received from the respective UEs through Equation 12, and a correlation value calculating process of the BS is described with reference to FIG. 8. In FIG. 8, $\alpha_{i,k}$ is defined as $\alpha_{i,k}\Delta y_i^H s_k$. $\alpha_{i,k}^u$ is defined as $\alpha_{i,k}^u \Delta y_{i,u}^H s_k$. And, $y_{i,u}^H$ indicates an Rx signal of a BS when a uth UE sends an RACH signal but the rest of UEs fail to send RACH signals. If a channel is flat, does not change according to time, and has no noise, such relation as $x_{0,\bar{j}}^* \alpha_{0,k}^u = \ldots = x_{R-1,\bar{j}}^* \alpha_{R-1,k}^u = \alpha_k^u$ is established. For clarity of the description, if such a channel state is assumed, correlation values calculated by a BS can be illustrated as FIG. 8.

In FIG. 8, it can be observed that an RACH signal (sequence index 0, phase pattern vector index 2) sent by UE 1 is detected from a $3^{rd}$ correlation value. And, it can be observed that an RACH signal (sequence index 0, phase pattern vector index 3) sent by UE 2 is detected from a $4^{th}$ correlation value in FIG. 8. Moreover, it can be observed that an RACH signal (sequence index 1, phase pattern vector index 3) sent by UE 3 is detected from an $8^{th}$ correlation value in FIG. 8.

Particularly, despite that UE 1 and UE 2 selected the same sequence, as a result from applying different phase pattern vectors, a BS can distinguish RACH signals of the two UEs. Therefore, the BS can distinguish RACH signals in case of different phase pattern vector indexes as well as RACH signals in case of different sequences.

Meanwhile, it can be observed from FIG. 8 that 4 correlation values corresponding to the sequence index 0 can be represented as a combination of 4 scalar values $\{\alpha_{0,0}, \alpha_{1,0}, \alpha_{2,0}, \alpha_{3,0}\}$. Namely, the BS can easily obtain 4 correlation values in a manner of performing calculation on 4 scalar values and then applying a phase pattern vector to the scalar values. Here, since a steps of applying the phase pattern vector is a simple sign change only whereas calculation of $\alpha_{i,k}\Delta y_i^H s_k$ is a product operation of a vector and a vector, complexity due to the application of the phase pattern vector is relatively insignificant.

Meanwhile, if the BS identifies the RACH signal sent by the UE in the above manner, the BS sends an RACH response signal indicating an estimated sequence and phase pattern vector to the UE. Here, the sequence and phase pattern vector indexes estimated by the BS may be represented as RA-PID (random access preamble ID). If phase pattern vector indexes are different despite the same sequence, a different RA-PID is generated. The BS sends the RA-PID to the UE in a manner that the RA-PID is contained in the RACH response signal.

In this case, the RA-PID should be defined to express both a sequence index and a phase pattern vector index. For example, if a sequence index is 64 and a phase pattern vector index is 1, RA-PID can be expressed as Equation 13.

$$\underset{64\quad\ 1}{11111001} \qquad \text{[Equation 13]}$$

The BS generates and sends an RA-PID contained RACH response signal to the UE, thereby informing the UE that the RACH signal of the UE was received.

Figure 9:
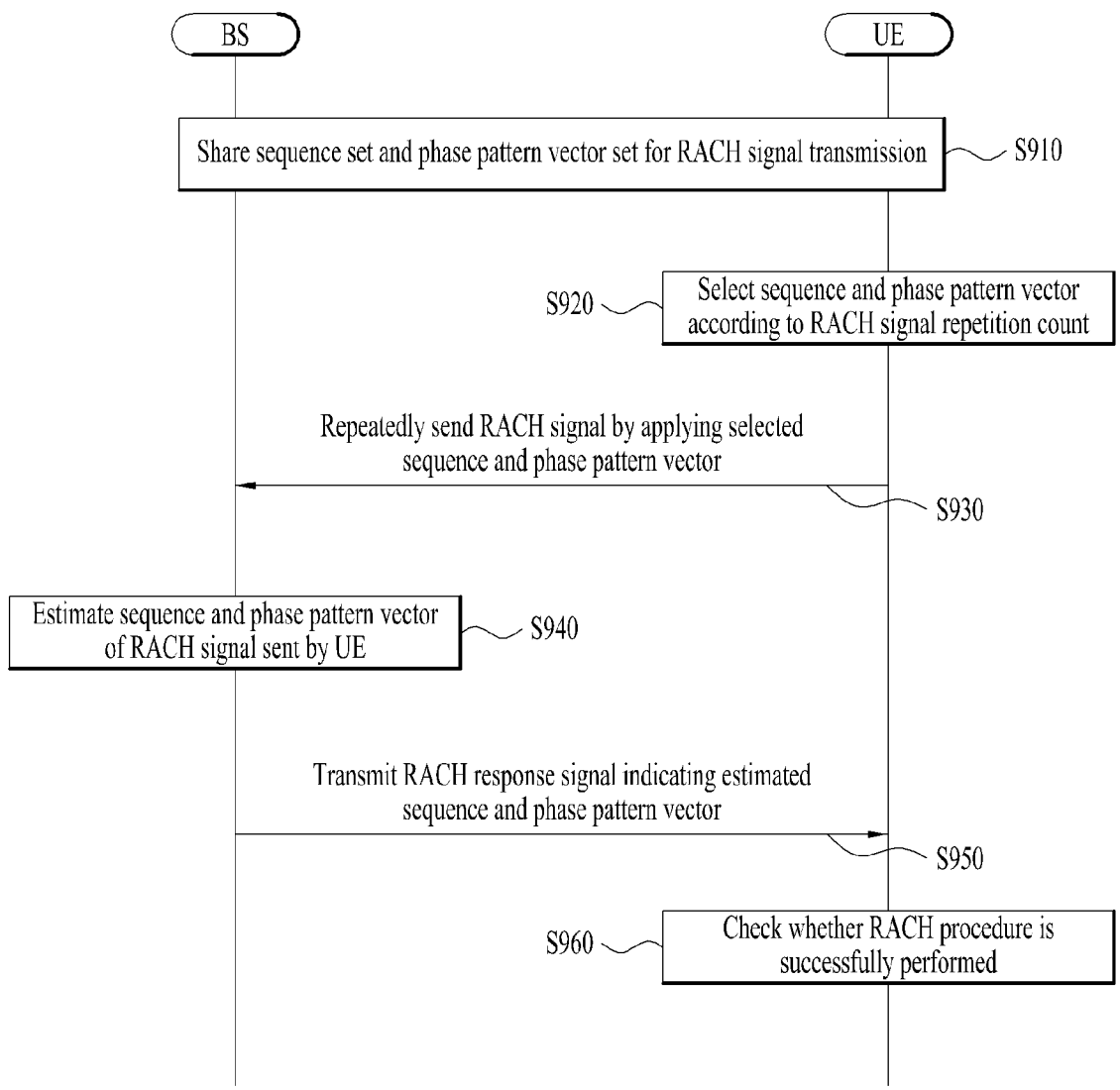
FIG. 9 is a flowchart showing a method of performing a random access procedure according to one embodiment.

FIG. 9 is a flowchart showing a method of performing a random access procedure according to one embodiment. FIG. 9 shows the aforementioned embodiments according to a time-series flow. Hence, the above-proposed embodiments are applicable identically or similarly despite that the details are omitted from the description with reference to FIG. 9.

First of all, in S910, a sequence set and a phase pattern vector set for an RACH signal transmission are shared between a BS and a UE. What kinds of a sequence set and a phase pattern vector set will be used for an RACH procedure can be determined and then notified to the UE by the BS. Or, a specific sequence set and a specific phase pattern vector set may be shared beforehand between the UE and the BS in form of agreement.

The UE selects a sequence and phase pattern vector to use for the RACH procedure according to an RACH signal repetitive transmission count [S9920]. A step of determining the repetitive transmission count of the RACH signal shall be described in detail with reference to FIG. 10. For example, if a repetitive transmission count is 4, a prescribed phase pattern vector is selected from a phase pattern vector set corresponding to '4' and a prescribed sequence is selected from a sequence set.

Subsequently, the UE sends an RACH signal generated from applying the selected sequence and phase pattern vector to the BS [S930]. The RACH signal sent by the UE is sent to the BS for a time interval amounting to a predetermined repetition count, and may be generated from multiplying the sequence selected in S920 by elements of the phase pattern vector selected in S920.

Meanwhile, the BS estimates a sequence and phase pattern vector of the RACH signal sent by the UE [S940]. Namely, the BS calculates a sequence and phase pattern vector applied to the transmission of the RACH signal by the UE through a step of calculating a correlation value between the received RACH signal and a combination of a random sequence and phase pattern vector. Such a step may be understood as a step of selecting a sequence and phase pattern vector, which maximize a correlation value according to Equation 12.

Subsequently, the BS sends an RACH response signal, which indicates the sequence and phase pattern vector estimated as used by the UE, to the UE [S950]. The RACH response signal may be sent in a manner of containing RA-PID indicating the estimated sequence and phase pattern vector. Having received the RACH response signal, the UE checks whether the sequence and phase pattern vector estimated by the BS match the sequence and phase pattern vector applied to the RACH signal by the UE itself, thereby checking whether the RACH procedure is successfully performed [S960].

According to the above-proposed embodiments, although UEs perform an RACH procedure by selecting a same sequence, if phase pattern vectors are different, a BS can distinguish them without interference. By simply increasing the number of sequences, it is able to resolve the collision of the RACH procedure between UEs. Yet, if the number of the sequences is increased, the following problems are caused. First of all, the higher the number of sequences gets, the larger inter-sequence correlation becomes. Hence, inter-sequence interference increases. If the sequence interference increases, it may cause a problem of degrading BS's sequence estimation performance Secondly, in LTE/LTE-A, a UE is informed of a sequence, which is usable for each cell, through SIB (system information block). If the number of sequences is increased, signaling information of such an SIB should be modified. Hence, it may cause a problem in aspect of backward compatibility. Moreover, in order to minimize RACH signal interference between cells, it may cause a problem that a predefined sequence table should be modified all. In order to support a legacy UE, it may cause a problem that an existing sequence table should be retained as well.

On the contrary, according to a proposed embodiment, a new phase pattern vector is introduced additionally while an existing sequence set is utilized intactly. By utilizing a sequence and phase pattern vector, the number of RACH signals selectable by a UE becomes (size of sequence set X size of phase pattern vector set). As the number of RACH signals increases, complexity of BS's estimation step rises. Yet, since a phase pattern vector calculating step is a simple scalar operation step only, as described above, it is advantageous in that the complexity rise is relatively negligible.

Figure 10:
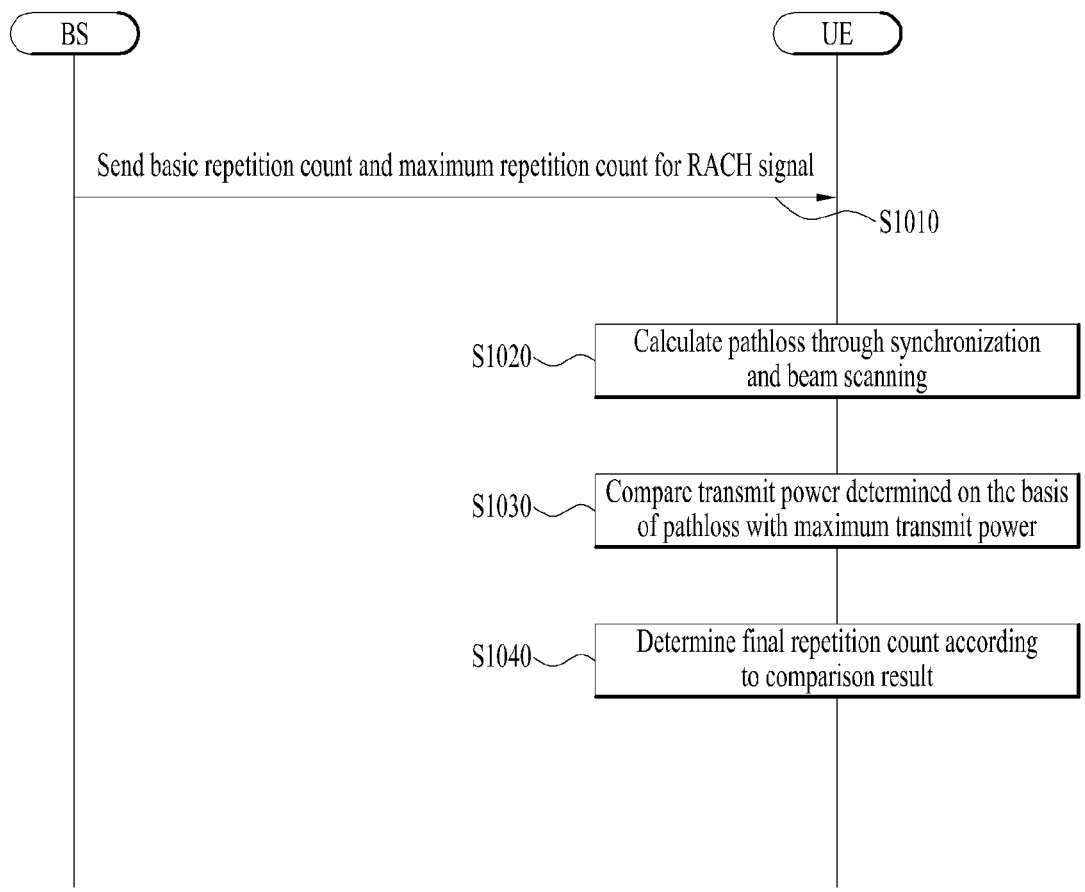
FIG. 10 is a flowchart showing a repetition count determining method according to another embodiment.

FIG. 10 is a flowchart showing a repetition count determining method according to another proposed embodiment. With respect to the former proposed embodiment, a process for determining a repetitive transmission count of RACH signals is described with reference to FIG. 10.

First of all, a BS sends a default repetition count and a maximum repetition count for transmission of RACH signal to a UE [S1010]. The default repetition count or the maximum repetition count is selected as a repetition count the UE will apply to the transmission of the RACH signal actually.

Meanwhile, the UE calculates a pathloss through a synchronization procedure and a beam scanning procedure performed ahead of an RACH procedure [S1020]. Subsequently, the UE determines RACH Rx power of the BS and RACH Tx power of the UE based on the calculated pathloss [S1030]. Here, the RACH Rx power means an Rx power estimated when an RACH signal sent by the UE arrives at the BS. And, the UE determines RACH Tx power of its own to match the RACH Rx power. Such steps are already described in FIG. 7 and Equation 10, and the corresponding details shall be omitted.

Subsequently, the UE compares the determined RACH Tx power with the maximum Tx power of the UE [S1030], thereby determining a final repetition count [S1040]. If the determined RACH Tx power is smaller than the maximum Tx power of the UE, the UE determines the default repetition count received in S1010 as an RACH repetitive transmission count. If the determined RACH Tx power is greater than the maximum Tx power of the UE, the UE determines the maximum repetition count received in S1010 as an RACH repetitive transmission count. In the latter case, the UE may determine a random count smaller than the maximum repetition count as an RACH repetition count using a difference or ratio between the RACH Tx power and the maximum Tx power of the UE.

The following description is made by taking a case that a default repetition count and a maximum repetition count are 4 and 16, respectively as an example. First of all, a UE calculates a pathloss and determines RACH Tx power of the UE from RACH Rx power of a BS. If Table 3 is taken as one example, in case of a UE K1 and a UE L2, since a necessary Tx power is smaller than UE's maximum Tx power (23 dB), an RACH repetition count becomes 4. Meanwhile, in case of a UE K3, since a necessary Tx power is greater than a maximum Tx power by a size of 3 dB, the RACH success rate of the UE is degraded by the size. In this case, the UE determines a repetition count not as 4 but as a maximum repletion count '16'. If so, the UE K3 can obtain an additional power gain of 6 dB and an RACH success rate enhanced better than those of other UEs. Or, based on a difference or ratio between a necessary Tx power and a maximum Tx power, the UE K3 may determine a repetition count as '8' smaller than the maximum repetition count.

3. Second Proposed Random Access Performing Method

In the above description, described is an embodiment of utilizing a sequence and a phase pattern vector in an RACH procedure between a UE and a BS. In the following, described is an embodiment of adaptively adjusting a transmission timing of an RACH signal in addition to the aforementioned RACH procedure. According to embodiments described below, as a transmission timing of an RACH signal sent by a UE is adjusted, although RSCH signals using the same phase pattern vector for the same repetition count are sent, a BS can distinguish them.

Figure 11:
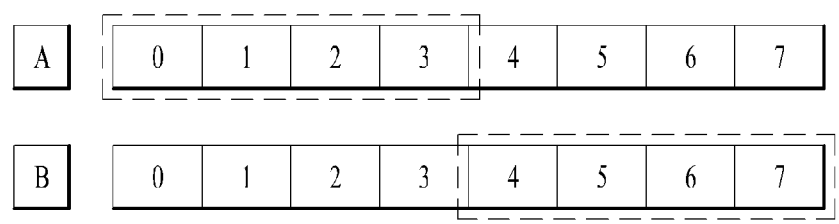
FIG. 11 is a diagram to describe a method of performing a random access procedure according to another embodiment.

FIG. 11 is a diagram to describe a method of performing a random access procedure according to another embodiment. Regarding FIG. 11, the following description is made by taking an example of a case that a default repetition count and a maximum repetition count are determined as 4 and 8, respectively.

In case that a default repetition count and a maximum repetition count are determined as 4 and 8, respectively, a UE can send RACH signals in $0^{th}$ and $4^{th}$ OFDM symbols among $0^{th}$ to $7^{th}$ OFDM symbols. Referring to FIG. 11, a UE A sends an RACH signal in the $0^{th}$ OFDM symbol, and a UE B sends an RACH signal in the $4^{th}$ ODFM symbol. Meanwhile, if a repetition count of a UE is determined as 8 equal to a maximum repetition count, the UE should send an RACH signal by starting with the $0^{th}$ OFDM symbol. Such an example is summarized and represented in Table 7.

TABLE 7

| Repetition count | Transmittable timing |
|---|---|
| 4 | 0, 4 |
| 8 | 0 |

In FIG. 11, since the RACH signals sent by the UE A and the UE B are sent at different timings, respectively, a BS can detect the RACH signals of the two UEs by avoiding the overlapping between the RACH signals. Namely, as the two RACH signals are detected, the BS can be aware that the two UEs are attempting access, which is the same as the case that the UE A and the UE B use the same sequence and the same phase pattern vector. In response to this, the BS generates 2 RACH response signals indicating 2 different transmission timings and then sends them to the UEs, respectively.

The UE acquires information on an RA-PID (i.e., sequence and phase pattern vector) and a transmission timing, which are estimated by the BS, through the RACH response signal, and then compares the information with RA-PID and transmission timing of the RACH signal sent by the UE. If a comparison result says 'identical', the UE determines that its RACH procedure has been performed successfully. Yet, as a result of the comparison, if at least one of the sequence, the phase pattern vector, and the transmission timing is not matched, the RACH procedure on the BS is determined as failure. Eventually, the UE A and the UE B can perform Rach procedure on the BS by sending RACH signals at a specific timing in the whole transmission interval corresponding to a maximum repetition count. So to speak, according to the proposed embodiment, by informationalizing a transmission timing of an RACH signal, RACH collision probability can be further reduced.

Meanwhile, in the aforementioned process, the BS can inform UEs of a phase pattern vector set usable at a specific repetition count. Here, in a step of sharing a phase pattern vector set between a UE and a BS like S910 of FIG. 9, the BS may inform the UE of some phase pattern vectors usable or unusable for each repetition count within the phase pattern vector set. Moreover, phase pattern vectors having different repetition counts may be set to lie in mutually nested orthogonal relation.

For a detailed example, in a phase pattern vector set for a repetition count 4 represented in Table 8, a phase pattern vector of an index #3 is set as an unusable phase pattern vector. Table 9 shows a case that a phase pattern vector of an index #3 and a phase pattern vector of an index #7 in a phase pattern vector set for a repetition count 8 are set as usable phase pattern vectors only. Meanwhile, phase pattern vectors represented in Table 8 and Table 9 are defined on the basis of OVSF (orthogonal variable spreading factor) codes.

TABLE 8

| Index | Phase pattern vector | Usable/Unusable |
|---|---|---|
| 0 | [1 1 1 1] | Usable |
| 1 | [1 1 −1 −1] | Usable |
| 2 | [1 −1 1 −1] | Usable |
| 3 | [1 −1 −1 1] | Unusable |

TABLE 9

| Index | Phase pattern vector | Usable/Unusable |
|---|---|---|
| 0 | [1 1 1 1 1 1 1 1] | Unusable |
| 1 | [1 1 −1 −1 1 1 −1 −1] | Unusable |
| 2 | [1 −1 1 −1 1 −1 1 −1] | Unusable |
| 3 | [1 −1 −1 1 1 −1 −1 1] | Usable |
| 4 | [1 1 1 1 −1 −1 −1 −1] | Unusable |
| 5 | [1 1 −1 −1 −1 −1 1 1] | Unusable |
| 6 | [1 −1 1 −1 −1 1 −1 1] | Unusable |
| 7 | [1 −1 −1 1 −1 1 1 −1] | Usable |

The reason why some phase pattern vectors are set unusable in such a phase pattern vector set is to satisfy the nested orthogonal property between phase pattern vectors of different repetition counts. Namely, since some of vectors in the phase pattern vector set has not inclusive relation to vectors of a different repetition count (i.e., not nested orthogonal), if such vectors are used together with the vector of the different repetition count, the BS is unable to distinguish the two RACH signals. Hence, the BS may be set to use some vectors, which meet the nested orthogonal property, among the vectors included in the phase pattern vector set only. This is described in detail through the embodiment shown in FIG. 12.

Figure 12:
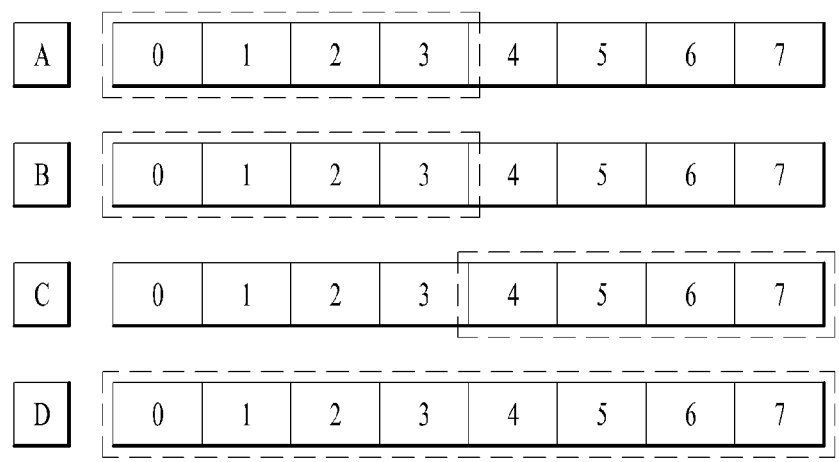
FIG. 12 is a diagram to describe a method of performing a random access procedure according to another embodiment.

FIG. 12 is a diagram to describe a method of performing a random access procedure according to another embodiment. FIG. 12 shows the following case. First of all, a UE A performs an RACH procedure using a phase pattern vector of an index 0 in a phase pattern vector set having a repetition count '4' in Table 8, a UE B performs an RACH procedure using a phase pattern vector of an index 2 in Table 8, a UE C performs an RACH procedure using a phase pattern vector of an index 2 in Table 8, and a UE D performs an RACH procedure using a phase pattern vector of an index 3 in Table 8. Each of the UE A and the UE B sends an RACH signal at a $0^{th}$ timing, the UE C sends an RACH signal at a 4th timing, and the UE D sends an RACH signal at a $0^{th}$ timing. Each of the UEs A to C has a repetition count '4', and the UE D has a repetition count '8'.

The BS processes the received 4 RACH signals according to Equation 14.

$$\{\hat{j}, \hat{R}, \hat{k}\} = \underset{\hat{j}, R, \hat{k}}{\operatorname{argmax}} \left| \sum_{i=0}^{R-1} (x_{i,j}^{\hat{R}})^* y_i^H s_{\hat{k}} \right|^2 \quad \text{[Equation 14]}$$

Parameters of Equation 14 are identical to those of Equation 12, $x_{i,j}^R$ indicates an $i^{th}$ element of a $j^{th}$ phase pattern vector of a repetition count R, and $\hat{R}$ indicates a repetition count that makes a correlation value become a maximum. For example, $0^{th}$ and $1^{st}$ elements of a $3^{rd}$ phase pattern vector (index=3) in a phase pattern vector set of a repetition count '8' are 1 and −1, respectively. The BS searches for $\{\hat{j}, \hat{R}, \hat{k}\}$ that makes a correlation value become a maximum through Equation 14.

Meanwhile, since the UE A and the UE B select different phase pattern vectors in FIG. 12 and the two phase pattern vectors are orthogonal to each other, the BS can distinguish RACH signals of the two UEs. Since the UE C and the UE A/B differ from each other in a transmission timing, the RACH signal of the UE C is received at a transmission timing different from those of the RACH signals of the UEs A and B. Hence, the BS can distinguish the RACH signal of the UE C as well.

The case of the UE D and the UE A/B/C is described with reference to Table 10 as follows. In Table 10, [0 0 0 0] indicates that the corresponding UE does not sent an RACH signal at the corresponding timing.

TABLE 10

| UE | Phase pattern vector (transmission timing 0) | Phase pattern vector (transmission timing 4) |
|---|---|---|
| A | [1 1 1 1] | [0 0 0 0] |
| B | [1 −1 1 −1] | [0 0 0 0] |
| C | [0 0 0 0] | [1 −1 1 −1] |
| D | [1 −1 −1 1] | [1 −1 −1 1] |

If an estimated repetition count is 4, Table 10 shows that phase pattern vectors are always orthogonal to each other irrespective of a transmission timing. When the BS identifies the RACH signal of the UE A, since the RACH signal of the UE D has an orthogonal phase pattern vector, it does not cause interference. Likewise, Since phase pattern vectors are orthogonal to each other between the RACH signals of the UEs C and D, interference is not caused. Meanwhile, the BS detects [1 −1 −1 1] vector of the UE D at each of the transmission timing 0 and the transmission timing 4. Yet, since the phase pattern vector [1 −1 −1 1] of the index 3 is set unusable in Table 8, the BS can recognize that the [1 −1 −1 1] vector is not the phase pattern vector of the repetition count 4 but the phase pattern vector having the index 3 of the repetition count 8 in Table 9.

Subsequently, if the estimated repetition count is 8 in Table 10, the BS calculates correlation by applying $3^{rd}$ and $7^{th}$ phase pattern vectors of Table 9. In this case, each of the phase pattern vectors of the UEs A, B and C is orthogonal to the phase pattern vector of the UE D. The following description is made by taking the UE C as an example. As a vector [0 0 0 0 1 −1 1 −1] generated from adding [0 0 0 0] to the phase pattern vector of the UE C is orthogonal to the phase pattern vector of the UE D for the transmission timing 0, the phase pattern vectors of the UE C and the UE D are nested orthogonal to each other. This identically applies between the UE A/B and the UE D. Eventually, when the UE D is identified, RACH signals of the rest of the UEs have no effect. As described above, this is because some phase pattern vectors usable for each repetition count are set in advance.

When a usable or unusable phase pattern vector is set per repetition count in advance, as described above, the BS can identify RACH signals between UEs having different repetition counts without interference. This means that the BS can identify an RACH signal irrespective of a specific timing for a random UE to send the RACH signal in a whole transmission interval.

Meanwhile, although a usable or unusable phase pattern vector per repetition count may be shared between a BS and a UE in a manner of being notified to the UE by the BS, a phase pattern vector set fixed in offline form may be determined between the UE and the BS in advance.

According to another embodiment, a size of a phase pattern vector for each repetition count can be adjusted differently depending on a service radius of a cell. If the service radius (or, size) of the cell increases, a size of a phase pattern vector set having a big repetition count is defined lager and a size of a phase pattern vector set having a small repetition count is defined small. On the contrary, if the service radius (or, size) of the cell is small, a size of a phase pattern vector set having a big repetition count is defined small and a size of a phase pattern vector set having a small repetition count is defined large. If a size of a phase pattern vector is large/small, it means that the number of usable phase pattern vectors included in the corresponding set is big/small.

If the BS services an area C1 only in FIG. 7, the repetition count of RACH signal selected by most of UEs may be small. On the contrary, if the BS services up to an area C3, many UEs may desire a bigger repetition count of RACH signal. In the latter case, if a size of a phase pattern vector set having a high repetition count is set small (i.e., less phase pattern vectors included in the phase pattern vector set of the high repetition count are set), probability for UEs to select a same phase pattern vector is raised. Hence, probability of RACH signal collision between UEs increases as well. Therefore, the BS sets more usable phase pattern vectors included in a phase pattern vector set having a high repetition count but may set less usable phase pattern vectors included in a phase pattern vector set of a relatively small repetition count.

For example, if the BS services the area C1 only, phase pattern vector sets of repetition counts 4 and 8 may be determined as Table 11 and Table 12, respectively.

TABLE 11

| Index | Phase pattern vector | Usable/unusable |
|-------|----------------------|-----------------|
| 0 | [1 1 1 1] | Usable |
| 1 | [1 1 −1 −1] | Unusable |
| 2 | [1 −1 1 −1] | Usable |
| 3 | [1 −1 −1 1] | Unusable |

TABLE 12

| Index | Phase pattern vector | Usable/unusable |
|-------|----------------------|-----------------|
| 0 | [1 1 1 1 1 1 1 1] | Unusable |
| 1 | [1 1 −1 −1 1 1 −1 −1] | Usable |
| 2 | [1 −1 1 −1 1 −1 1 −1] | Unusable |
| 3 | [1 −1 −1 1 1 −1 −1 1] | Usable |
| 4 | [−1 −1 −1 −1 −1 −1 −1 −1] | Unusable |
| 5 | [1 1 −1 −1 −1 −1 1 1] | Usable |
| 6 | [1 −1 1 −1 −1 1 −1 1] | Unusable |
| 7 | [1 −1 −1 1 −1 1 1 −1] | Usable |

Compared with Table 8 and Table 9, size changes of phase pattern vector sets of Table 11 and Table 12 are shown in Table 13.

TABLE 13

| Repetition count | # of usable vectors before adjustment | # of usable vectors after adjustment |
|------------------|---------------------------------------|--------------------------------------|
| 4 | 3 | 2 |
| 8 | 2 | 4 |

According to Table 13, the number of usable vectors is reduced into 2 from 3 in the phase pattern vector set of a repetition count 4. Yet, the number of usable vectors is raised to 4 from 2 in the phase pattern vector set of a repetition count 8.

Meanwhile, configurations such as Table 11 and Table 2 are not unique embodiments but simple examples. Namely, a phase pattern vector of an index 2 can be configured as unusable instead of an index 1 in Table 11. In this case, phase pattern vectors of indexes 2 and 6 become usable instead of phase pattern vectors of indexes 1 and 5 in Table 12.

Figure 13:
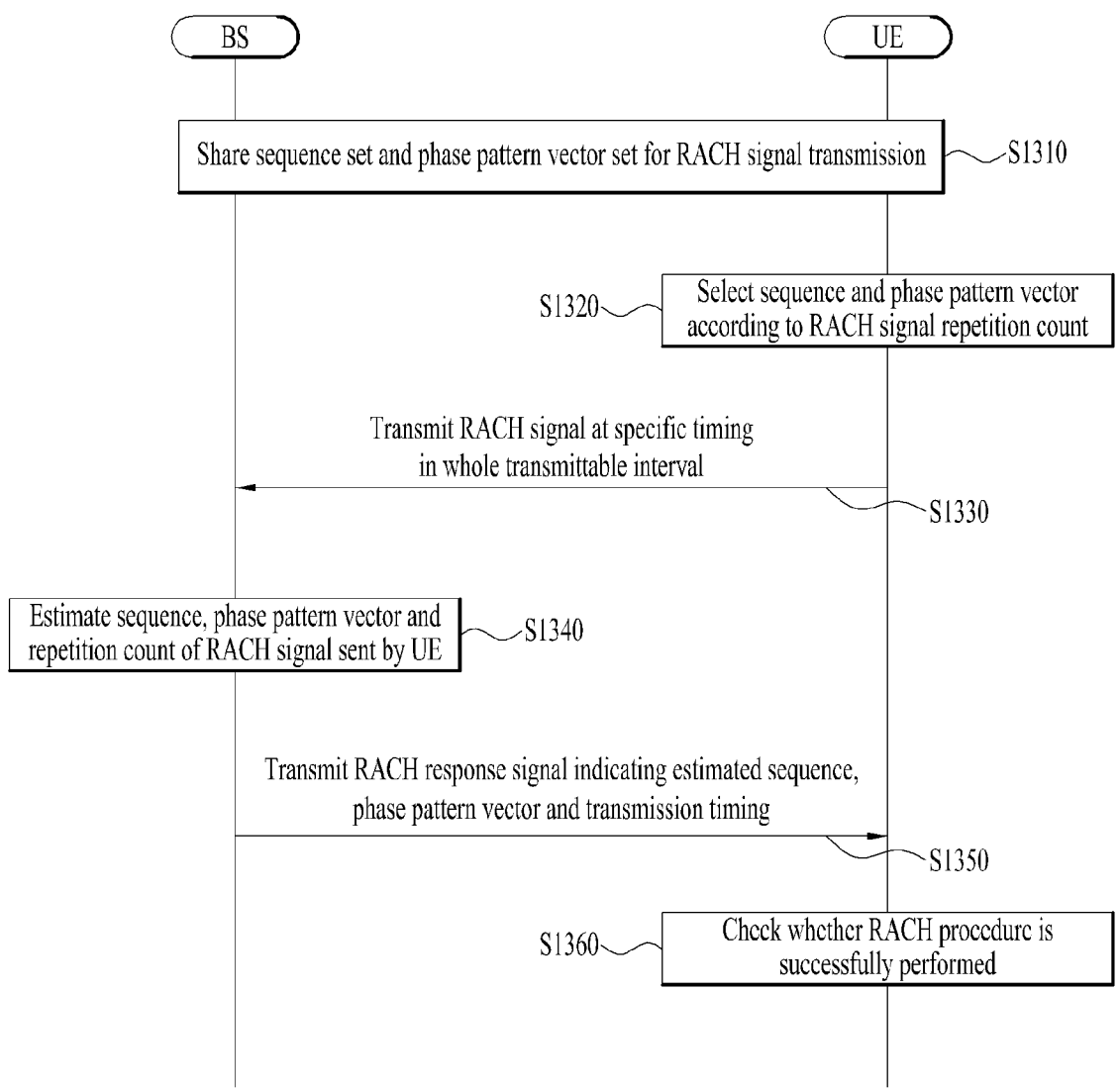
FIG. 13 is a diagram to describe a method of performing a random access procedure according to further embodiment.

FIG. 13 is a flowchart showing a method of performing a random access procedure according to further proposed embodiment. FIG. 13 shows the aforementioned embodiments according to a time-series flow. Hence, the above-proposed embodiments are applicable identically or similarly despite that the details are omitted from the description with reference to FIG. 13.

First of all, in S1310, a sequence set and a phase pattern vector set for an RACH signal transmission are shared between a BS and a UE. Here, a phase pattern vector set for a random repetition count may be configured with usable phase pattern vectors only among phase pattern vectors orthogonal to each other. So to speak, the phase pattern vector set of S1310 may mean phase pattern vectors except an unusable phase pattern vector set among all phase pattern vectors for a specific repetition count.

Meanwhile, what kinds of a sequence set and a phase pattern vector set will be used for an RACH procedure can be determined and then notified to the UE by the BS. Or, a specific sequence set and a specific phase pattern vector set may be shared beforehand between the UE and the BS in form of agreement.

Subsequently, the UE selects a sequence and phase pattern vector to use for the RACH procedure according to an RACH signal repetitive transmission count [S1320]. The step described with reference to FIG. 10 may be similarly applicable to a step of determining the repetitive transmission count of the RACH signal. For example, if a repetitive transmission count is 4, a prescribed phase pattern vector is selected from usable phase pattern vectors included in a phase pattern vector set corresponding to '4' and a prescribed sequence is selected from a sequence set.

Subsequently, the UE sends an RACH signal generated from applying the selected sequence and phase pattern vector to the BS, and the RACH signal is sent at a specific timing in a whole transmittable interval (i.e., a time interval corresponding to a maximum repetition count) [S1330]. The RACH signal sent by the UE is sent to the BS for a time interval amounting to a predetermined repetition count, and may be generated from multiplying the sequence selected in S1320 by elements of the phase pattern vector selected in S1320.

The BS estimates a sequence, phase pattern vector and repetition count of the RACH signal sent by the UE [S1340]. Namely, the BS calculates a sequence, phase pattern vector and repetition count applied to the transmission of the RACH signal by the UE through a step of calculating a correlation value between the received RACH signal and a combination of a random sequence, phase pattern vector and repetition count. Such a step may be understood as a step of selecting a sequence, phase pattern vector and repetition count, which maximize a correlation value according to Equation 14.

Subsequently, the BS sends an RACH response signal, which indicates the sequence, phase pattern vector and transmission timing estimated as used by the UE, to the UE [S1350]. The RACH response signal may be sent in a manner of containing RA-PID indicating the estimated sequence and phase pattern vector. Having received the RACH response signal, the UE checks whether the sequence, phase pattern vector and repetition count estimated by the BS match the parameters and transmission timing applied to the RACH signal by the UE itself, thereby checking whether the RACH procedure is successfully performed [S1360].

According to the above-proposed embodiments, although UEs perform an RACH procedure by selecting a same sequence and a same phase pattern vector, if transmission timings are different, a BS can distinguish them without interference.

4. Apparatus Configuration

Figure 14:
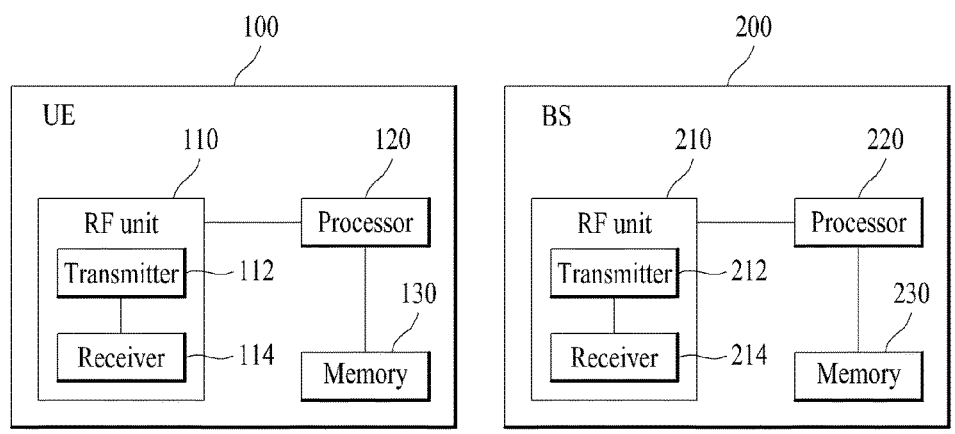
FIG. 14 is a diagram showing a configuration of a user equipment and a base station related to a proposed embodiment.

FIG. 14 is a block diagram showing the configuration of a user equipment and a base station according to one embodiment of the present invention. In FIG. 11, the user equipment 100 and the base station 200 may include radio frequency (RF) units 110 and 210, processors 120 and 220 and memories 130 and 230, respectively. Although a 1:1 communication environment between the user equipment 100 and the base station 200 is shown in FIG. 11, a communication environment may be established between a plurality of user equipment and the base station. In addition, the base station 200 shown in FIG. 11 is applicable to a macro cell base station and a small cell base station.

The RF units 110 and 210 may include transmitters 112 and 212 and receivers 114 and 214, respectively. The transmitter 112 and the receiver 114 of the user equipment 100 are configured to transmit and receive signals to and from the base station 200 and other user equipments and the processor 120 is functionally connected to the transmitter 112 and the receiver 114 to control a process of, at the transmitter 112 and the receiver 114, transmitting and receiving signals to and from other apparatuses. The processor 120 processes a signal to be transmitted, sends the processed signal to the transmitter 112 and processes a signal received by the receiver 114.

If necessary, the processor 120 may store information included in an exchanged message in the memory 130. By this structure, the user equipment 100 may perform the methods of the various embodiments of the present invention.

The transmitter 212 and the receiver 214 of the base station 200 are configured to transmit and receive signals to and from another base station and user equipments and the processor 220 are functionally connected to the transmitter 212 and the receiver 214 to control a process of, at the transmitter 212 and the receiver 214, transmitting and receiving signals to and from other apparatuses. The processor 220 processes a signal to be transmitted, sends the processed signal to the transmitter 212 and processes a signal received by the receiver 214. If necessary, the processor 220 may store information included in an exchanged message in the memory 230. By this structure, the base station 200 may perform the methods of the various embodiments of the present invention.

The processors 120 and 220 of the user equipment 100 and the base station 200 instruct (for example, control, adjust, or manage) the operations of the user equipment 100 and the base station 200, respectively. The processors 120 and 220 may be connected to the memories 130 and 230 for storing program code and data, respectively. The memories 130 and 230 are respectively connected to the processors 120 and 220 so as to store operating systems, applications and general files.

The processors 120 and 220 of the present invention may be called controllers, microcontrollers, microprocessors, microcomputers, etc. The processors 120 and 220 may be implemented by hardware, firmware, software, or a combination thereof.

If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 120 and 220.

Meanwhile, the aforementioned method may be implemented as programs executable in computers and executed in general computers that operate the programs using computer readable media. In addition, data used in the aforementioned method may be recorded in computer readable recording media through various means. It should be understood that program storage devices that can be used to describe storage devices including computer code executable to perform various methods of the present invention do not include temporary objects such as carrier waves or signals. The computer readable media include storage media such as magnetic recording media (e.g. ROM, floppy disk and hard disk) and optical reading media (e.g. CD-ROM and DVD).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The aforementioned random access performing method is applicable to various wireless communication systems including an IEEE 802.16x system and an IEEE 802.11x system as well as to a 3GPP LTE/LTE-A system. Moreover, a proposed method is applicable to an mmWave communication system that uses an ultra-high frequency band.

What is claimed is:

1. A method of performing a random access by a user equipment (UE) in a wireless communication system, the method comprising:
    obtaining information on a sequence set and information on a phase pattern vector set among a plurality of phase pattern vector sets,
    wherein the sequence set and the phase pattern vector set comprise a plurality of sequences and a plurality of phase pattern vectors, respectively;
    wherein a respective phase pattern vector set among the plurality of phase pattern vector sets is pre-configured differently according to respective repetitive transmission count among a plurality of repetitive transmission counts for a random access channel (RACH) signal;
    selecting a phase pattern vector from the plurality of phase pattern vectors;
    selecting a sequence from the plurality of sequences;
    obtaining the RACH signal based on the sequence and the selected phase pattern vector,
    wherein a phase of the sequence is changed by applying the selected phase pattern vector to the sequence;
    transmitting, to a base station (BS), the RACH signal repeatedly for as many times as a repetitive transmission count, included in the plurality of repetitive transmission counts, at a specific transmission timing in a whole time interval related to a maximum repetitive transmission count; and
    receiving, from the BS, a RACH response signal comprising information on an estimated sequence, information on an estimated phase pattern vector and information on an estimated transmission timing,
    wherein the specific transmission timing denotes a specific orthogonal frequency division multiplexing (OFDM) symbol with an index, and the index is determined based on the maximum repetitive transmission count.

2. The method of claim 1, wherein the respective phase pattern vector set comprises usable phase pattern vectors and at least one unusable phase pattern vector,
    wherein the plurality of usable phase pattern vectors are orthogonal to each other, and
    wherein the at least one unusable phase pattern vector is not orthogonal to the plurality of usable phase pattern vectors, respectively.

3. The method of claim 1, wherein in case that:
    the maximum repetitive transmission count is 8, the specific transmission timing is a $0^{th}$ OFDM symbol,
    the maximum repetitive transmission count is 4, the specific transmission timing is one of the $0^{th}$ OFDM symbol or a $4^{th}$ OFDM symbol, and the maximum repetitive transmission count is 2, the specific transmission timing is one of the $0^{th}$ OFDM symbol, a $2^{nd}$ OFDM symbol, the $4^{th}$ OFDM symbol, or a $6^{th}$ OFDM symbol.

4. The method of claim 1, wherein the estimated sequence, the estimated phase pattern vector and the estimated transmission timing are determined based on a sequence, a phase pattern vector and a repetition count that maximize a correlation value with the RACH signal transmitted by the UE, respectively.

5. The method of claim 1, wherein in case that a service radius of the BS increases, a number of phase pattern vectors configuring a phase pattern vector set of a big repetition count is defined to increase and a number of phase pattern vectors configuring a phase pattern vector set of a small repetition count is defined to decrease.

6. The method of claim 1, wherein the respective phase pattern vector set comprises a plurality of usable phase pattern vectors and at least one unusable phase pattern vector,
wherein a first usable phase pattern vector included in a first phase pattern vector set for a first specific repetition count is orthogonal to a part of a second usable phase pattern vector included in a second phase pattern vector set for a second specific repetition count which is larger than the first repetition count,
wherein a number of elements included in the first usable phase pattern vector is less than a number of elements included in the second usable phase pattern vector.

7. The method of claim 1, wherein a number of phase pattern vectors included in a first phase pattern vector set, among the plurality of the phase pattern vector sets, for a first specific repetition count is less than a number of phase pattern vectors included in a second phase pattern vector set, among the plurality of the phase pattern vector sets, for a second specific repetition count which is larger than the first repetition count.

8. A user equipment (UE) for performing a random access in a wireless communication system, the UE comprising:
a transmitter;
a receiver; and
at least one processor coupled with the transmitter and the receiver, wherein the at least one processor is configured to:
obtain information on a sequence set and information on a phase pattern vector set among a plurality of phase pattern vector sets,
wherein the sequence set and the phase pattern vector set comprise a plurality of sequences and a plurality of phase pattern vectors, respectively;
wherein a respective phase pattern vector set among the plurality of phase pattern vector sets is pre-configured differently according to respective repetitive transmission count among a plurality of repetitive transmission counts for a random access channel (RACH) signal;
select a phase pattern vector from the plurality of phase pattern vectors;
select a sequence from the plurality of sequences;
obtain the RACH signal based on the sequence and the selected phase pattern vector,
wherein a phase of the sequence is changed by applying the selected phase pattern vector to the sequence;
transmit, to a base station (BS), the RACH signal repeatedly for as many times as the repetitive transmission count, included in the plurality of repetitive transmission counts, at a specific transmission timing in a whole time interval related to a maximum repetitive transmission count; and
receive, from the BS, a RACH response signal comprising information on an estimated sequence, information on an estimated phase pattern vector and information on an estimated transmission timing,
wherein the specific transmission timing denotes a specific orthogonal frequency division multiplexing (OFDM) symbol with an index, and the index is determined based on the maximum repetitive transmission count.

9. The UE of claim 8, wherein the respective phase pattern vector set comprises usable phase pattern vectors and at least one unusable phase pattern vector,
wherein the plurality of usable phase pattern vectors are orthogonal to each other, and
wherein the at least one unusable phase pattern vector is not orthogonal to the plurality of usable phase pattern vectors, respectively.

10. The UE of claim 8, wherein in case that:
the maximum repetitive transmission count is 8, the specific transmission timing is a $0^{th}$ OFDM symbol,
the maximum repetitive transmission count is 4, the specific transmission timing is one of the $0^{th}$ OFDM symbol or a $4^{th}$ OFDM symbol, and
the maximum repetitive transmission count is 2, the specific transmission timing is one of the $0^{th}$ OFDM symbol, a $2^{nd}$ OFDM symbol, the $4^{th}$ OFDM symbol, or a $6^{th}$ OFDM symbol.

11. The UE of claim 8, wherein the estimated sequence, the estimated phase pattern vector and the estimated transmission timing are determined based on a sequence, a phase pattern vector and a repetition count that maximize a correlation value with the RACH signal transmitted by the UE, respectively.

12. The UE of claim 8, wherein in case that a service radius of the BS increases, a number of phase pattern vectors configuring a phase pattern vector set of a big repetition count is defined to increase and a number of phase pattern vectors configuring a phase pattern vector set of a small repetition count is defined to decrease.

13. The UE of claim 8, wherein the respective phase pattern vector set comprises a plurality of usable phase pattern vectors and at least one unusable phase pattern vector,
wherein a first usable phase pattern vector included in a first phase pattern vector set for a first specific repetition count is orthogonal to a part of a second usable phase pattern vector included in a second phase pattern vector set for a second specific repetition count which is larger than the first repetition count,
wherein a number of elements included in the first usable phase pattern vector is less than a number of elements included in the second usable phase pattern vector.

14. The UE of claim 8, wherein a number of phase pattern vectors included in a first phase pattern vector set, among the plurality of the phase pattern vector sets, for a first specific repetition count is less than a number of phase pattern vectors included in a second phase pattern vector set, among the plurality of the phase pattern vector sets, for a second specific repetition count which is larger than the first repetition count.

* * * * *